(12) United States Patent
Wan et al.

(10) Patent No.: US 11,945,542 B1
(45) Date of Patent: Apr. 2, 2024

(54) EXPRESS TRICYCLE TARGET OBJECT

(71) Applicants: China Automotive Engineering Research Institute Co., Ltd., Chongqing (CN); Intelligent Connected Technology of CAERI Co., Ltd., Chongqing (CN)

(72) Inventors: Xinming Wan, Chongqing (CN); Qiang Zhang, Chongqing (CN); Xin Zhang, Chongqing (CN); Yu Tang, Chongqing (CN); Tao Chen, Chongqing (CN); Wei Pan, Chongqing (CN); Yi Li, Chongqing (CN)

(73) Assignees: China Automotive Engineering Research Institute Co., Ltd., Chongqing (CN); Intelligent Connected Technology of CAERI Co., Ltd., Chongqing (CN)

( * ) Notice: Subject to any disclaimer, the term of this patent is extended or adjusted under 35 U.S.C. 154(b) by 0 days.

(21) Appl. No.: 18/522,168

(22) Filed: Nov. 28, 2023

(30) Foreign Application Priority Data

Feb. 17, 2023 (CN) .......................... 202310134975.2

(51) Int. Cl.
*B62K 5/02* (2013.01)
*B62K 5/06* (2006.01)
*B62K 7/02* (2006.01)
*B62K 9/02* (2006.01)

(52) U.S. Cl.
CPC .................. *B62K 5/06* (2013.01); *B62K 5/02* (2013.01); *B62K 7/02* (2013.01); *B62K 9/02* (2013.01)

(58) Field of Classification Search
CPC ... B62K 5/06; B62K 5/02; B62K 7/02; B62K 9/02
See application file for complete search history.

(56) References Cited

U.S. PATENT DOCUMENTS

| | | | | |
|---|---|---|---|---|
| 6,158,542 | A * | 12/2000 | Nolet ...................... | B62K 7/04 180/206.6 |
| 2015/0122566 | A1* | 5/2015 | Constien .................. | B62J 6/022 280/651 |
| 2016/0368464 | A1* | 12/2016 | Hassounah ............. | B60L 53/80 |

(Continued)

FOREIGN PATENT DOCUMENTS

| | | |
|---|---|---|
| CN | 108844747 A | 11/2018 |
| CN | 111098684 A | 5/2020 |
| CN | 112378673 A | 2/2021 |

(Continued)

*Primary Examiner* — Jacob D Knutson
*Assistant Examiner* — Marlon A Arce (57) ABSTRACT

Disclosed is an express tricycle target object, falling within the field of intelligent connected vehicle (ICV) test equipment. A base plate, vehicle body support plates, two lateral support plates, a vehicle head support plate, several locking mechanisms and skins are included. The vehicle body support plates, the lateral support plates and the vehicle head support plate are assembled into the shape of the express tricycle target object via the locking mechanisms, and different parts of the skins are arranged with wave-absorbing sponges to reduce a radar cross section or with metal substances to enhance a radar cross section, to solve the problem of the insufficient coverage of traffic accident scenes in current tests of the active safety performance of ICVs.

4 Claims, 5 Drawing Sheets

(56) References Cited

U.S. PATENT DOCUMENTS

2018/0010984 A1    1/2018  Silberling et al.
2022/0388592 A1\*  12/2022  I Nnani .................... A42B 3/30

FOREIGN PATENT DOCUMENTS

| CN | 212844376 U | 3/2021 |
|----|-------------|--------|
| CN | 213180693 U | 5/2021 |
| CN | 112944027 A | 6/2021 |
| CN | 113348373 A | 9/2021 |
| CN | 214993314 U | 12/2021 |
| CN | 115221177 A | 10/2022 |
| WO | 2013070153 A1 | 5/2013 |
| WO | 2018007459 A1 | 1/2018 |

\* cited by examiner

EXPRESS TRICYCLE TARGET OBJECT

TECHNICAL FIELD

The present disclosure relates to the field of intelligent connected vehicle (ICV) test equipment, in particular to an express tricycle target object.

BACKGROUND

With the development and progress of our country, ICVs have gradually stepped into contemporary human life, and the carry of the active safety function of the ICVs has gradually become the choice of automotive OEMs. In order to improve and perfect the functional performance of the active safety configuration of the ICVs, the integrity of traffic accident scenes in traffic simulation tests of the ICVs needs to be improved. For a long time, most of the target objects used in vehicle testing refer to regulations such as European New Car Assessment Programme (Euro-NCAP) and the products of mainstream imported test equipment manufacturers. However, the target object categories of imported products cannot fully meet China's national conditions.

Through the statistical study of traffic accidents occurred in China in recent years, the traffic accidents involving express tricycles are common. In order to reflect the rigor and comprehensiveness of ICV testing, and to meet the requirements of China's characterization of testing scenes, the ability of testing ICVs to identify the express tricycles needs to be improved and the active safety behavior after identification needs to be increased. Therefore, it is particularly important to study and manufacture an express tricycle target object of conforming to China's characteristics and being capable of replacing an express tricycle in a real scene as testing equipment to test and evaluate the active safety performance of the ICVs.

SUMMARY

The present disclosure aims to provide an express tricycle target object to solve the problem that there is currently no target object in China that can replace the express tricycle in a real scene, resulting in the insufficient coverage of traffic accident scenes in current tests of the active safety performance of the ICVs.

In order to achieve the above object, the present disclosure adopts the following technical solutions. An express tricycle target object includes a base plate, vehicle body support plates, two lateral support plates, a vehicle head support plate, several locking mechanisms and skins. The vehicle body support plates, the lateral support plates and the vehicle head support plate are all arranged on the base plate, rear wheels and reflectors are arranged on the lateral support plates, and a front wheel is arranged on the vehicle head support plate. The vehicle body support plates, the lateral support plates and the vehicle head support plate are assembled into the shape of the express tricycle target object via the locking mechanisms, the skins are sleeved on the express tricycle target object, and different parts of the skins are arranged with wave-absorbing sponges to reduce a radar cross section or with metal substances to enhance a radar cross section.

The solution has the beneficial effects that: the vehicle body support plates, the lateral support plates and the vehicle head support plate are assembled into the shape of the express tricycle via the locking mechanisms, the skins are sleeved on the shaped express tricycle target object, and images of the real express tricycle can be drawn on the skins, so that the target object is similar to a real express tricycle in visual perception. Then, the radar cross section is reduced by adding wave-absorbing sponges at different parts of the skins, or the radar cross section is enhanced by adding metal substances. An RCS value of the express tricycle target object can be made closer to that of the real express tricycle to ensure that the target object can replace the express tricycle in the real scene, which solves the problem of the incomplete coverage of traffic accident scenes in current tests of the active safety performance of ICVs.

The rapid assembly and mass production of the express tricycle target object are realized by means of modular assembly, which can be more widely used in vehicle test scenes. In the solution, the express tricycle target object can be reused after being impacted at a speed of 60 km/h. Compared with the current domestic common method of taking support rods as a bone structure and wrapping foam outside the support rods to mount a testing target object, the method not only solves the problems of many structural parts and complicated mounting process in existing mounting methods, but also solves the problems that the front and rear parts are easy to collapse, easy to be damaged and difficult to be repaired when being hit by a vehicle because the target object is too large and the support structure cannot meet the overall support. At the same time, compared with the express tricycle target object composed of support rods, the RCS value of the express tricycle target object in the solution can be aligned to be close to that of the real express tricycle, so that the real scene can be restored more realistically and the accuracy of the test results can be improved.

Preferably, the vehicle body support plates and the vehicle head support plate are arranged between the two lateral support plates, and the vehicle body support plates include a front vehicle body support plate, a middle vehicle body support plate and a rear vehicle body support plate.

The solution has the beneficial effects that: the vehicle body support plates are connected to the front, middle and rear of the two lateral support plates, which can further improve the structure stability of the express tricycle target object to avoid the collapse of a hollow part of the vehicle body and an effect on the use of the express tricycle.

Preferably, a transverse support plate is further included. The transverse support plate is arranged between the two lateral support plates, and the vehicle head support plate is connected to the transverse support plate.

The solution has the beneficial effects that: the transverse support plate is added to improve the stability of the connection mechanism at the vehicle head of the express tricycle target object.

Preferably, the vehicle body support plates, the lateral support plates, the vehicle head support plate, the front wheel, the rear wheels and the transverse support plate are made of polyethylene foams.

The solution has the beneficial effects that: as a new environment-friendly packaging material, polyethylene foam has the characteristics of good plasticity and high toughness, further ensuring that the express tricycle target object can withstand the impact at a 60 km/h speed.

Preferably, the skin is of a double-layer material, and images of a portrait, a vehicle head and a carriage are painted on the skin.

The solution has the beneficial effects that: the double-layer skin can facilitate the operation of adding the wave-absorbing sponge or aluminum foil, and at the same time, the express tricycle target object similar to the real express tricycle is further satisfied in visual perception, thereby improving the accuracy of the test results.

Preferably, the base plate is configured as a static base plate or a driving plate.

The solution has the beneficial effects that: when the test scene does not require the express tricycle target object to move, the static base plate is selected as the base plate and is made of a foam to save the test cost. When the test scene requires that the express tricycle target object moves accurately along a pre-programmed route at a defined speed, the base plate is replaced with the driving plate to realize that the express tricycle target object simulates the running of the real express tricycle, thereby improving the comprehensiveness of the simulated scene.

Preferably, the locking mechanisms are elastic locking mechanisms, and each of the elastic locking mechanisms includes a first fixing plate, a second fixing plate, locking fasteners, elastic ropes and locking pieces. The locking fasteners are arranged on the first fixing plate, one end of the elastic rope is connected to the locking fastener, and the other end is sleeved on the locking piece.

The solution has the beneficial effects that: the locking mechanism is arranged as an elastic locking mechanism, when the express tricycle target object is impacted by the vehicle in a test process, the elasticity of the locking mechanism enables the relative movement between support plates, thereby playing a buffering role on the impact, reducing the possibility of the express tricycle target object being damaged by the impact, and improving the reuse rate. However, the cooperation between the elastic ropes and the locking pieces makes the locking operations more convenient. By pre-fixing the first fixing plates and the second fixing plates, the modularity of the target object is improved to facilitate the mounting and use in the field.

Preferably, the elastic locking mechanism further includes a thickening plate and a third fixing plate, and both the thickening plate and the third fixing plate are arranged on the lateral support plate.

The solution has the beneficial effects that: the thickening plates and the third fixing plates are added at the joints to improve the structure stability of the joints of the elastic locking mechanisms.

Preferably, first magnets are arranged on the first fixing plate, second magnets are arranged on the second fixing plate, and the first magnets can be sucked with the second magnets.

The solution has the beneficial effects that: it is difficult to pull two magnets apart by force when the two magnets are sucked to each other, and it is relatively easy to displace the two magnets when the two magnets are in a magnetic suction state. Therefore, the additions of the first magnet and the second magnet can improve the strength of the connection of the elastic locking mechanism, and can also meet the requirement that the elastic locking mechanism provides a space for relative displacement between the support plates.

Preferably, a thickness of the locking fastener is equal to a sum of thicknesses of the first magnet and the second magnet.

The solution has the beneficial effects that: the thickness of the locking fastener is the same as the sum of the thicknesses of the first magnet and the second magnet, so that after the first magnet and the second magnet are sucked together, the left end and the right end of the locking fastener respectively provide a leftward force to the first fixing plate and a rightward force to the second fixing plate. Moreover, the tighter the first magnet and the second magnet are, the greater the force is, thereby serving to press the first fixing plate towards the rear vehicle body support plate and press the second fixing plate towards the lateral support plate, to improve the fixing effect of the first fixing plate and the second fixing plate.

DETAILED DESCRIPTION

In the following, further details are given by means of specific implementations.

Reference numerals and denotations thereof: 1—base plate; 2—lateral support plate; 21—rear wheel; 22—circular hole; 31—front vehicle body support plate; 32—middle vehicle body support plate; 33—rear vehicle body support plate; 4—vehicle head support plate; 41—front wheel; 5—transverse support plate; 6—thickening plate; 61—first fixing plate; 62—second fixing plate; 63—third fixing plate; 64—elastic rope; 65—locking piece; 66—locking fastener; 67—first magnet; and 68—second magnet.

EXAMPLES

Figure 1:
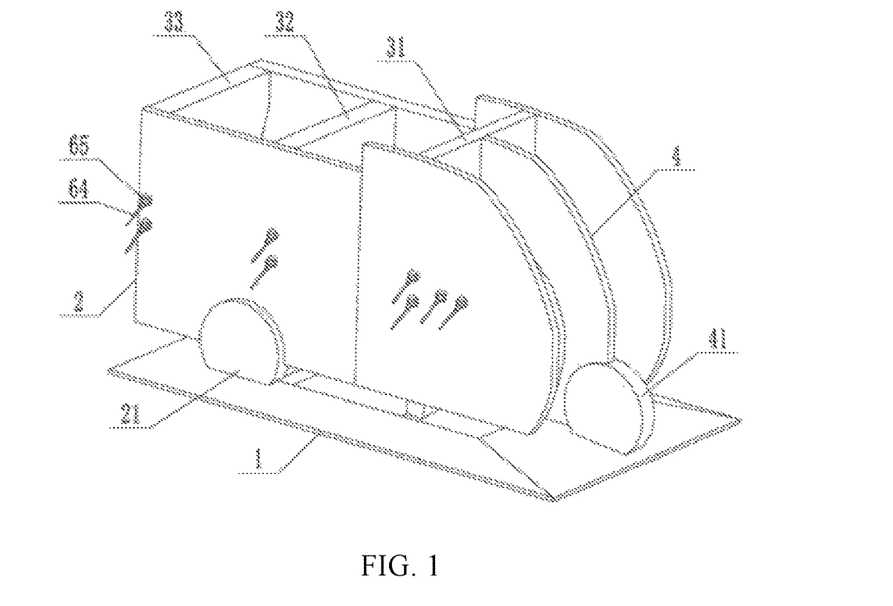
FIG. 1 is a three-dimensional view according to an example of the present disclosure.

Examples are basically as shown in FIGS. 1-6. An express tricycle target object as shown in FIG. 1 includes a base plate 1, a front vehicle body support plate 31, a middle vehicle body support plate 32, a rear vehicle body support plate 33, two lateral support plates 2, a vehicle head support plate 4, a transverse support plate 5 and several locking mechanisms. Considering that a target object used in the active safety performance testing of an ICV not only needs to be visually similar to a real express tricycle, but also needs a radar cross section (RCS) value of the target object to be close to that of the real express tricycle. Therefore, the skins are further included, the skins are sleeved on the express tricycle target object, and different parts of the skins are arranged with wave-absorbing sponges to reduce the RCS value, or with metal substances to enhance the RCS value. In the example, the metal substance is aluminum foil.

The base plate 1 can be arranged as a static base plate or a driving plate. When the test scene does not require the express tricycle target object to move, a static base plate is selected as the base plate 1 and is made of a foam to save the test cost. When the test scene requires that the express tricycle target object can accurately move along a pre-programmed route at a defined speed, the base plate 1 is replaced with a driving plate to realize that the express tricycle target object simulates the running of the real express tricycle, thereby improving the comprehensiveness of the simulated scene. In the example, the driving plate is selected as the base plate 1 with a model of GST.

Figure 3:
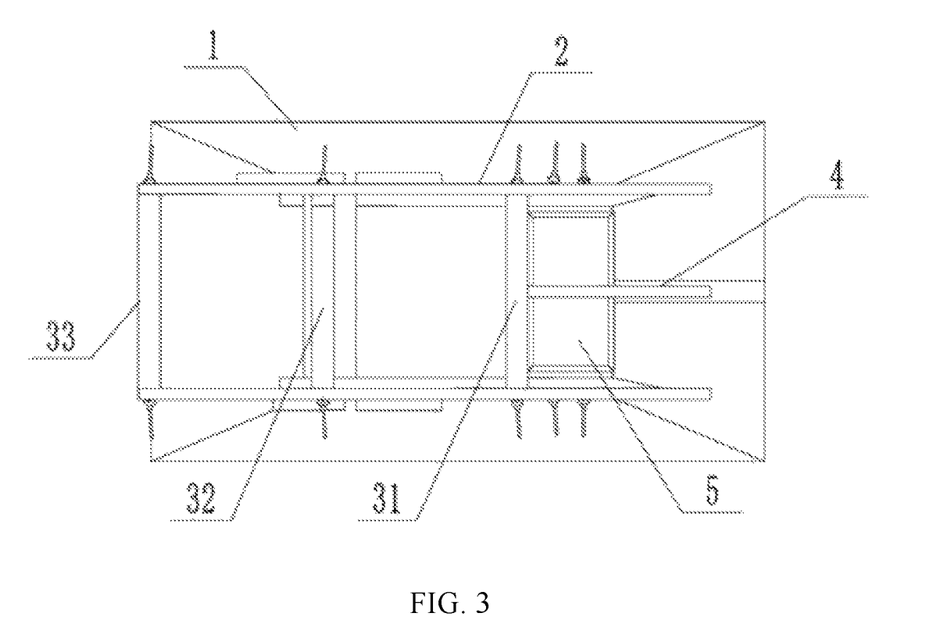
FIG. 3 is a top view according to an example of the present disclosure.
Figure 4:
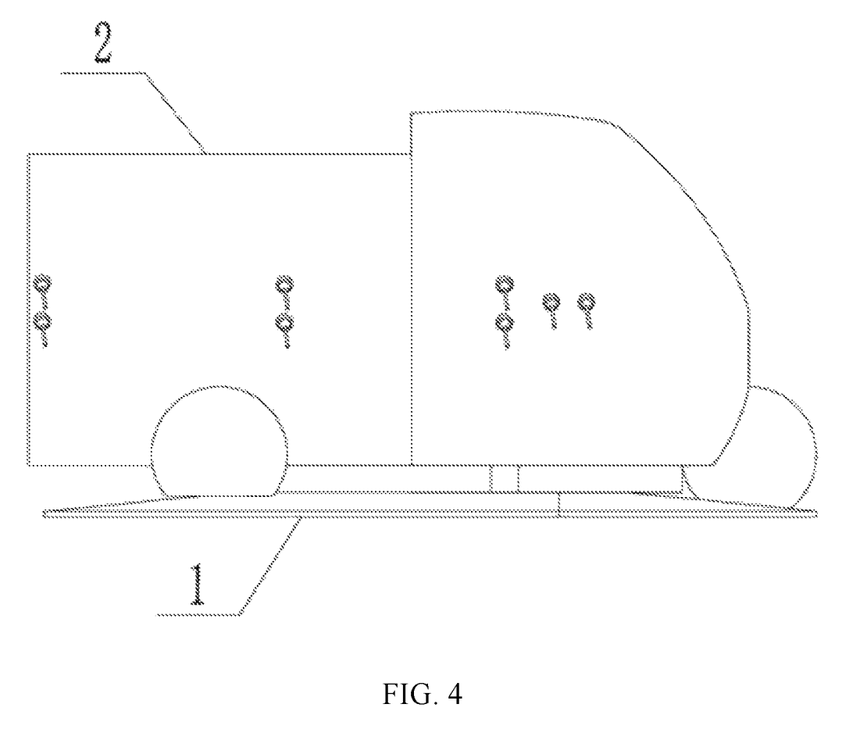
FIG. 4 is a left view according to an example of the present disclosure.

The bottoms of the front vehicle body support plate 31 and the middle vehicle body support plate 32 are fixed on the base plate 1 via AB felt; as shown in FIG. 4, the shape of the two lateral support plates 2 is the same as that of the whole vehicle when the real express tricycle is viewed from the side, including a carriage and a vehicle head. The two lateral support plates 2 are fixed at two sides of the front vehicle body support plate 31 and the middle vehicle body support plate 32 via the locking mechanisms, and the rear vehicle body support plate 33 is further fixed between the two lateral support plates 2 via the locking mechanisms. In the example, the front vehicle body support plate 31, the middle vehicle body support plate 32 and the rear vehicle body support plate 33 are distributed between the two lateral support plates 2 from the front to the rear with the direction of the vehicle head as front, and the top portions of the front vehicle body support plate 31, the middle vehicle body support plate 32 and the rear vehicle body support plate 33 are flush with the top portions of the lateral support plates 2 after being fixed. As shown in FIG. 3, the transverse support plate 5 is also fixed between the two lateral support plates 2 via the locking mechanisms, and the fixed transverse support plate 5 is located in front of the front vehicle body support plate 31; and the vehicle head support plate 4 is fixed on the transverse support plate 5 in a clamping manner. The specific clamping manner is as follows: a clamping groove is disposed on the vehicle head support plate 4, a height of the clamping groove is the same as that of the transverse support plate 5, and the vehicle head support plate 4 can be vertically clamped on the transverse support plate 5.

Figure 2:
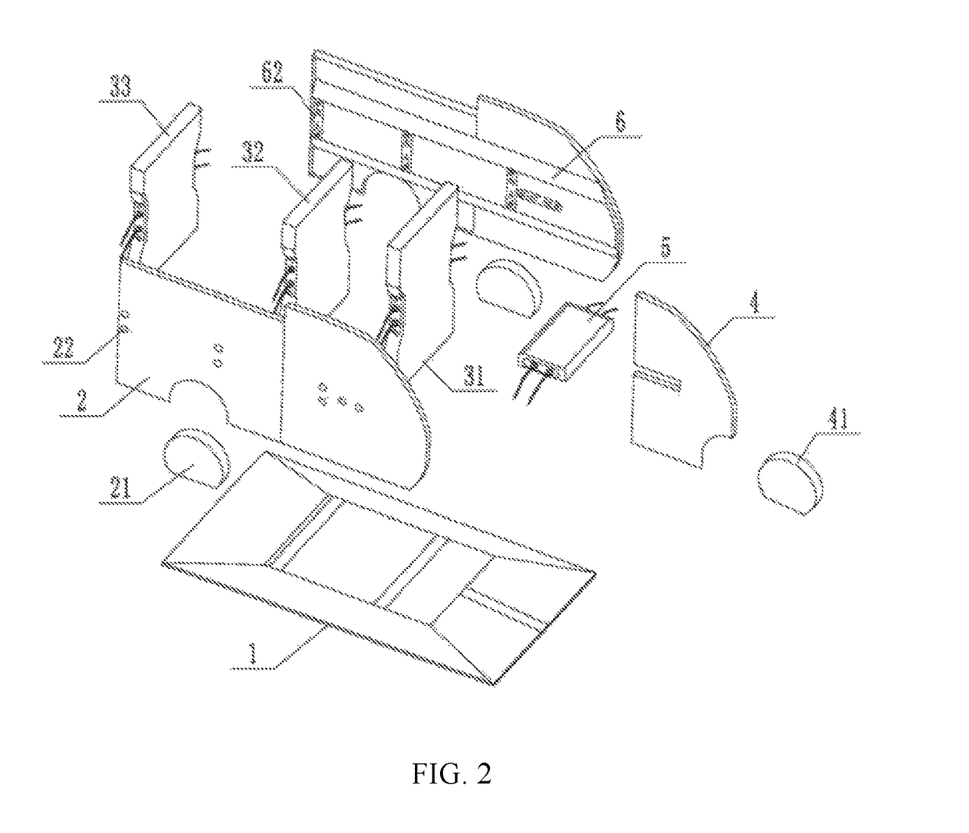
FIG. 2 is an exploded view according to an example of the present disclosure.

As shown in FIG. 2, a front wheel 41 and two rear wheels 21 are further included. The front wheel 41 is fixed between a bottom of the vehicle head support plate 4 and a top of the base plate 1 in a clamping manner, and the two rear wheels 21 are also fixed between bottoms of the two lateral support plates 2 and the top of the base plate 1 in a clamping manner. According to the national standard, the special express electric tricycle in China is to meet the following standards: a length of the whole vehicle is ≤3000 mm, a width of the whole vehicle (lateral dimensions of all fixed parts and a box body except reflectors) is ≤1000 mm, a height of the whole vehicle (a distance from a top of a carriage to the ground) is ≤1400 mm and a closed carriage is equipped with uniform identification. Therefore, in the example, after being fixed, the height from the top of the lateral support plate 2 to the bottom of the base plate is 1400 mm, the width between the two lateral support plates 2 is 1000 mm, and the length of both lateral support plates 2 is 3000 mm.

Figure 5:
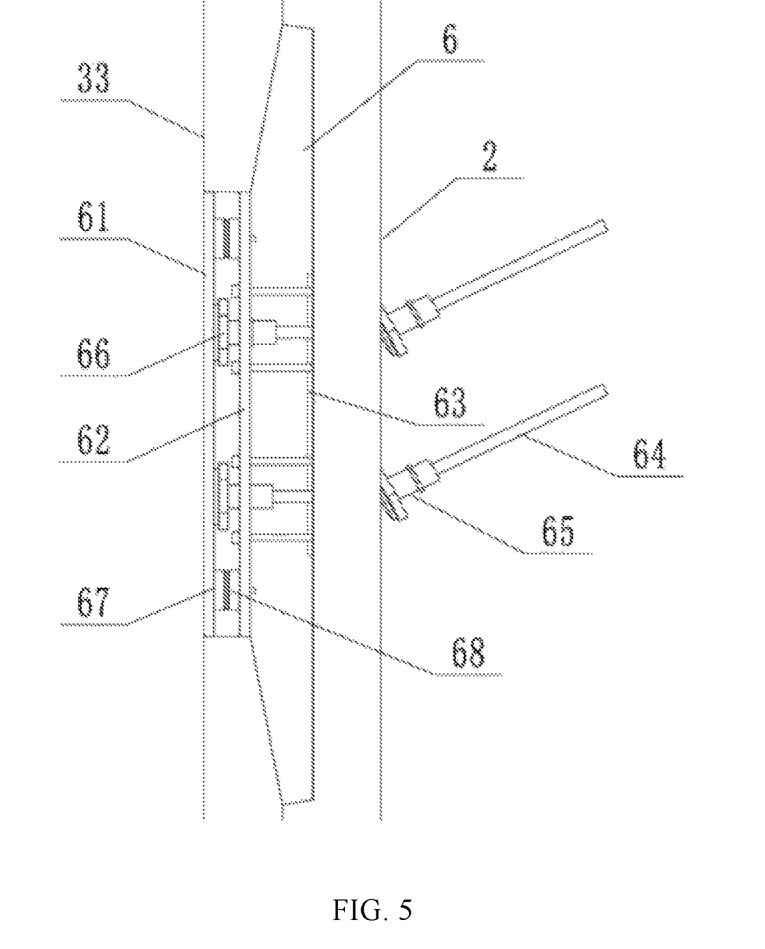
FIG. 5 is a structural view of an elastic locking mechanism according to an example of the present disclosure.

The locking mechanism is an elastic locking mechanism, and as shown in FIG. 5, a thickening plate 6 is added at the joint of each elastic locking mechanism to improve the structure stability of the joint of the elastic locking mechanism. Each elastic locking mechanism includes a first fixing plate 61, a second fixing plate 62, a third fixing plate 63 and two groups of elastic locking assemblies, and each group of the elastic locking assemblies includes first magnets 67, second magnets 68, elastic ropes 64, locking pieces 65 and locking fasteners 66. The specific arrangement mode of the elastic locking mechanism is explained by taking the connection between the lateral support plate 2 and the rear vehicle body support plate 33 as an example: the first magnets 67 and the first fixing plate 61 are fixed on the rear vehicle body support plate 33 via screws; the second magnets 68 are fixed on the second fixing plate 62 via screws; and the second fixing plate 62 and the third fixing plate 63 are placed on left and right sides of the thickening plate 6. Then the second fixing plate 62, the thickening plate 6 and the third fixing plate 63 are fixed together on the lateral support plate 2 via screws, one end of the elastic rope 64 is fixed in the locking fastener 66; the locking fastener 66 is fixed on the first fixing plate 61, and a thickness of the locking fastener 66 is the same as a sum of thicknesses of the first magnet 67 and the second magnet 68; so that after the first magnet 67 and the second magnet 68 are sucked together, the left end and the right end of the locking fastener 66 respectively provide a leftward force to the first fixing plate 61 and a rightward force to the second fixing plate 62. Moreover, the tighter the first magnet 67 and the second magnet 68 are, the greater the force is, thereby serving to press the first fixing plate 61 towards the rear vehicle body support plate 33 and press the second fixing plate 62 towards the lateral support plate 2, to improve the connecting and fixing effect between the first fixing plate 61 and the rear vehicle body support plate 33 and between the second fixing plate 62 and the lateral support plate 2. Circular holes 22 are arranged on the lateral support plates 2 and extend from right to left to the second fixing plates 62, the other end of the elastic rope 64 protrudes outwards from the lateral support plate 2 through the circular hole 22, the locking piece 65 is sleeved on a protruding end of the elastic rope 64, and the elastic rope 64 may be straightened outwards and fixedly locked by adjusting the locking piece 65. In the process that the elastic locking mechanisms fix the lateral support plates 2 and the rear vehicle body support plate 33, if the express tricycle target object is impacted by a vehicle in the test process, due to the elasticity of the elastic ropes 64, the lateral support plates 2 and the rear vehicle body support plate 33 can move relative to each other, thereby playing a buffering role on the impact and reducing the possibility of the lateral support plates 2 and the rear vehicle body support plate 33 being damaged by the impact, so that the express tricycle target object can be reused after being impacted at a speed of 60 km/h. Then the first magnets 67 and the second magnets 68 suck each other to improve the connection strength of the elastic locking mechanisms, at the same time, displacement occurs between the two magnets when the two magnets are impacted, further playing a buffering role in the impact and preventing the first fixing plates 61, the second fixing plates 62 and the third fixing plates 63 from falling off due to an excessive impact. The front vehicle body support plate 31, the middle vehicle body support plate 32, the rear vehicle body support plate 33, the lateral support plates 2, the vehicle head support plate 4, the transverse support plate 5, the front wheel 41, the rear wheels 21 and the thickening plate 6 are all made of polyethylene foams. As a new environment-friendly packaging material, polyethylene foam has the characteristics of good plasticity and high toughness, further ensuring that the express tricycle target object can withstand the impact at a 60 km/h speed. By the modularization, connection and fixing of the express tricycle target object using the elastic locking mechanisms, the rapid assembly of the express tricycle target object is realized. Compared with the current domestic common method of taking support rods as a bone structure and wrapping foam outside the support rods to mount a testing target object, the method not only solves the problems of many structural parts and complicated mounting process in existing mounting methods, but also solves the problems that the front and rear parts are easy to collapse, easy to be damaged and difficult to be repaired when being hit by a vehicle because the target object is too large and the support structure cannot meet the overall support. In addition, when a static base plate is selected as the base plate 1, the material of the static base plate is also polyethylene foam.

Figure 6:
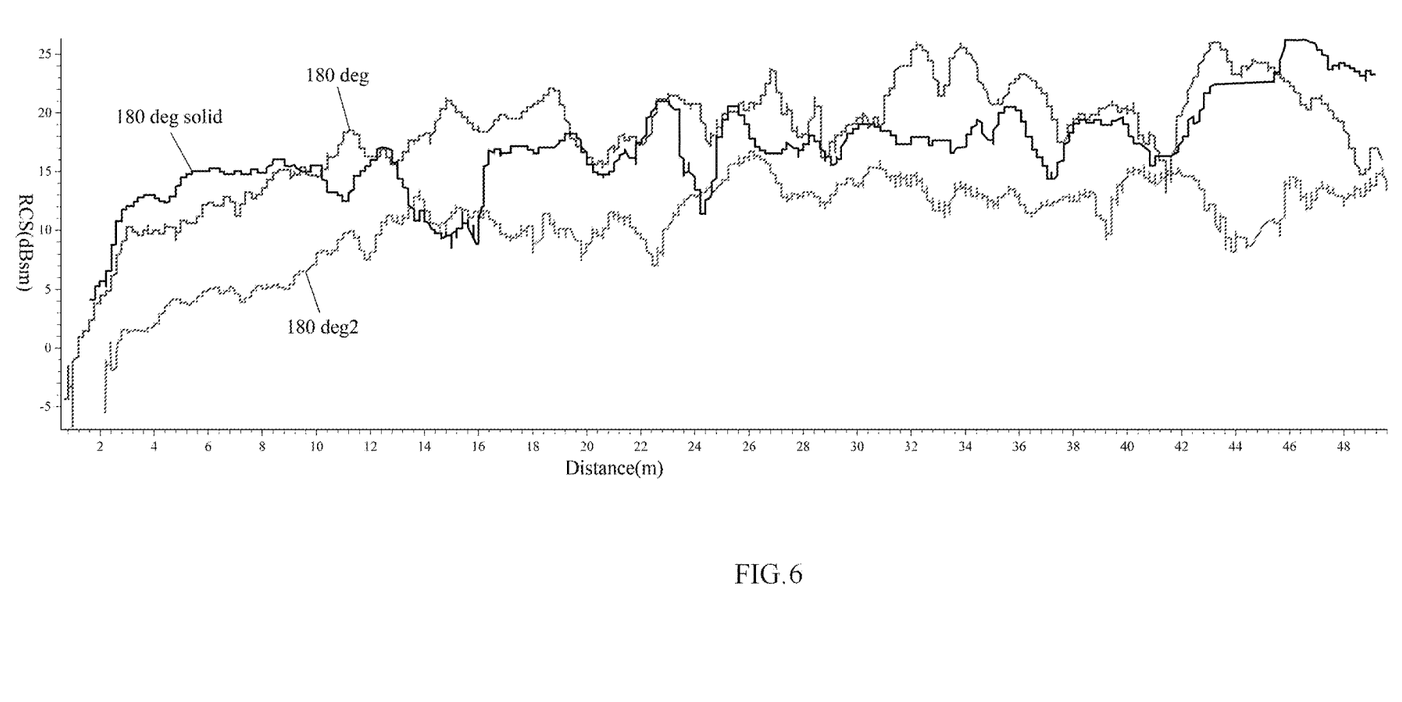
FIG. 6 is a comparison diagram of RCS curves according to an example of the present disclosure.

In addition, when aligning the RCS value of the target object, it is found that it is difficult to align the RCS value of the express tricycle target object composed of support rods to be close to that of the real express tricycle, and after the express tricycle target object is assembled and shaped by adopting a modular structure, the skins are sleeved on the express tricycle target object, and different parts of the skins are added with wave-absorbing sponges or aluminum foil, so that the RCS value of the express tricycle target object is close to that of the real express tricycle target object. As shown in FIG. 6, A represents a 180° RCS curve of the actual express tricycle, B represents a 180° RCS curve of the express tricycle target object before alignment, and C represents a 180° RCS curve of the express tricycle target object after alignment. When performing RCS alignment, by adding the wave-absorbing sponges or adding aluminum foil at the different parts of the skins, the difference between the RCS of the target object and the RCS of the actual express tricycle can be made within a range of ±10 dB, which is sufficient to satisfy the requirement of simulating a real scene. In the example, the RCS alignment detection method for the express tricycle target object is as follows: the RCS curve of the express tricycle target object is measured every 30° within a 0°-180° range from 4 m to 50 m using the radar detection vehicle carrying a 408 millimeter wave radar.

In addition, the skin is made of double-layer spray-painted cloth to facilitate the operation of adding wave-absorbing sponges or aluminum foil. At the same time, in order to satisfy that the express tricycle target object is similar to the real express tricycle in visual perception, the color of the skin can be selected to be white, blue or red according to requirements, and the skin includes a front windshield skin and a carriage skin. The patterns of a vehicle head of the tricycle, a portrait of a driver and a windshield are drawn on the front windshield skin, and a word of "Express" is drawn on the carriage skin according to the provisions of "Technical Requirements for Express Special Electric Tricycle (Exposure Draft)". Finally, reflectors are bonded to two sides of the vehicle head of the express tricycle target object sleeved with the skins via touch fasteners, and the reflectors are composed of polyethylene foam and silver foil paper.

The specific implementation processes are follows. Before assembling the express tricycle target object, the first fixing plates 61, the first magnets 67 and the locking fasteners 66 are fixed on two sides of the front vehicle body support plate 31, the middle vehicle body support plate 32, the rear vehicle body support plate 33 and the transverse support plate 5. Similarly, the second magnets 68, the second fixing plates 62, the thickening plates 6 and the third fixing plates 63 are fixed in advance on the two lateral support plates 2, and the circular holes 22 through which the elastic ropes 64 can pass are disposed; and then, according to the requirements of the test scene, it is determined that the driving plate is selected as the base plate 1.

During assembly: at step one, the front vehicle body support plate 31 and the middle vehicle body support plate 32 are fixedly bonded on the base plate 1.

At step two, the two lateral support plates 2 are fixed on two sides of the front vehicle body support plate 31 and the middle vehicle body support plate 32 via the elastic locking mechanisms. In the fixing process, the elastic ropes 64 on the first fixing plates 61 pass out of the lateral support plates 2 through the circular holes 22, the first magnets 67 and the second magnets 68 are sucked to perform preliminary fixing, then the locking pieces 65 pass through the elastic ropes 64, and the elastic ropes 64 are straightened and locked to complete the fixing.

At step three, the rear vehicle body support plate 33 and the transverse support plate 5 are sequentially fixed at rear ends and front sections of the two lateral support plates 2 respectively via the elastic locking mechanisms, and the vehicle head support plate 4 is clamped on the transverse fixing plate.

At step four, the front wheel 41 and the rear wheels 21 are clamped at the bottom of the vehicle head support plate 4 and the bottoms of the two lateral support plates 2 respectively to complete the preliminary assembly of the express tricycle target object.

At step five, the front windshield skin and the carriage skin are bonded to the express tricycle target object initially assembled and shaped via the touch fasteners.

At step six, the reflectors are fixed on the skins on two sides of the vehicle head via the touch fastener.

After the assembly is completed, the RCS of the express tricycle target object is aligned, and is basically consistent with that of the real express tricycle by adding the wave-absorbing sponges or adding the aluminum foil. During the active safety performance testing of the ICV, if the active safety monitoring and identification of the vehicle fails, the express tricycle target object is bumped, the elastic locking mechanism can play a buffering role on the bumping force, thereby reducing the situation that the target object is bumped and difficult to be repaired, and realizing the reuse of the target object. In addition, the operations of disassembling and mounting the express tricycle target object in the solution are simple and convenient, which can be widely used in vehicle testing field; and at the same time, the target object is modularized to achieve the purpose of mass production to meet the use requirements.

What has been described above is merely an example of the present disclosure, and common sense such as specific technical solutions and/or characteristics well known in the solutions is not described here. It is to be pointed out that for those skilled in the art, several modifications and improvements can be made without departing from the technical solutions of the present disclosure. The modifications and improvements are also regarded as the protection scope of the present disclosure, and will not affect the implementation effect of the present disclosure and the practicability of the patent. The scope of protection required by the present application is subject to the contents of the claims, and the detailed descriptions in the specification can be used to explain the contents of the claims.

What is claimed is:

1. An express tricycle target object, comprising a base plate, vehicle body support plates, two lateral support plates, a vehicle head support plate, several locking mechanisms and skins, the vehicle body support plates, the lateral support plates and the vehicle head support plate being all arranged on the base plate, rear wheels and reflectors being arranged on the lateral support plates, and a front wheel being arranged on the vehicle head support plate, the vehicle body support plates, the lateral support plates and the vehicle head support plate being assembled into the shape of the express tricycle target object via the locking mechanisms, the skins being sleeved on the express tricycle target object, and different parts of the skins being arranged with wave-absorbing sponges to reduce a radar cross section or with metal substances to enhance a radar cross section, and the vehicle body support plates and the vehicle head support plate being arranged between the two lateral support plates, and the vehicle body support plates comprising a front vehicle body support plate, a middle vehicle body support plate and a rear vehicle body support plate; further comprising a transverse support plate, the transverse support plate being arranged between the two lateral support plates, and the vehicle head support plate being connected to the transverse support plate, wherein the locking mechanisms are elastic locking mechanisms, and a thickening plate is arranged at the joint of each of the elastic locking mechanisms; the elastic locking mechanism comprises a first fixing plate, a second fixing plate, a third fixing plate and two groups of elastic locking assemblies, and each group of the elastic locking assemblies comprises first magnets, second magnets, elastic ropes, locking pieces and locking fasteners; the first magnets and the first fixing plate are fixed on the vehicle body support plates via screws, the second magnets are fixed on the second fixing plate via screws, and the second fixing plate and the third fixing plate are placed on left and right sides of the thickening plate; then the second fixing plate, the thickening plate and the third fixing plate are fixed together on the lateral support plate via screws, one end of the elastic rope is fixed in the locking fastener, the locking fastener is fixed on the first fixing plate, and a thickness of the locking fastener is the same as a sum of thicknesses of the first magnet and the second magnet; and circular holes are arranged on the lateral support plates and extend from right to left to the second fixing plates, the other end of the elastic rope protrudes outwards from the lateral support plate through the circular hole, the locking piece is sleeved on a protruding end of the elastic rope, and the elastic rope may be straightened outwards and fixedly locked by adjusting the locking piece.

2. The express tricycle target object according to claim 1, wherein the vehicle body support plates, the lateral support plates, the vehicle head support plate, the front wheel, the rear wheels and the transverse support plate are made of polyethylene foams.

3. The express tricycle target object according to claim 2, wherein the skin is of a double-layer material, and images of a portrait, a vehicle head and a carriage are painted on the skin.

4. The express tricycle target object according to claim 1, wherein the base plate is configured as a static base plate or a driving plate.

* * * * *